Dec. 19, 1950  G. F. KAHRE  2,534,554
FRUIT PRESS

Filed May 23, 1947  2 Sheets-Sheet 1

INVENTOR.
George F. Kahre
BY Herbert G. Fletcher
atty.

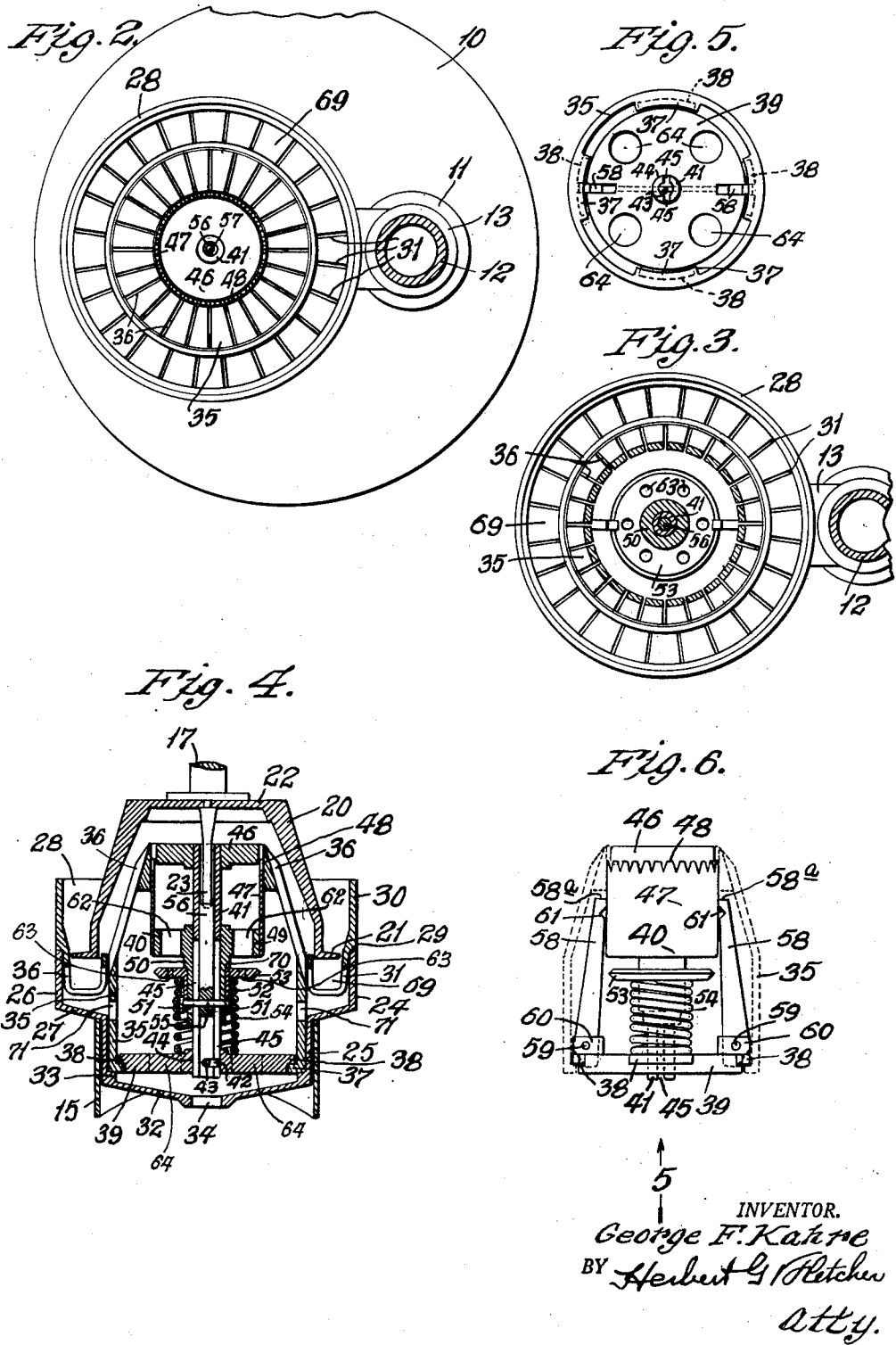

Patented Dec. 19, 1950

2,534,554

UNITED STATES PATENT OFFICE 2,534,554

FRUIT PRESS

George F. Kahre, Portland, Oreg.

Application May 23, 1947, Serial No. 750,128

14 Claims. (Cl. 100—42)

1

This invention relates to a press for citrus fruits, such as grapefruit, lemons, and oranges, for juicing the whole fruit without previously cutting or halving the fruit, thereby saving time in the operating cost of the device, this being a primary intent of the invention.

Another object of the invention is to provide a fruit press with improved means for pressing and squeezing the whole fruit so that the skin thereof after pressing, with a maximum amount of the pulp fibers clinging thereto, can be removed as residue and in one piece, thus eliminating the forming of a separate pulp ring.

A further object is to provide the fruit press with improved cutting or penetrating means.

A still further object is to provide a fruit press of a plurality of knock-down cooperative parts for sanitation purposes and of unique design for their ready reassembly.

Another further object is to provide improved means in the device for pressing and squeezing a maximum amount of the juice from accumulated detached fruit fibers.

It is also an object of the invention to provide the device with an improved removable annular pan which will catch and retain detached pulp fibers and seeds from the pressed fruit and with a cooperable pressing annulus for engaging and pressing the detached accumulated fibers.

With the foregoing and other objects in view which will appear as the description proceeds, my invention resides in the combination and arrangements of parts and in the details of construction hereinafter described and claimed, it being understood that changes may be made within the scope of what is claimed, without departing from the spirit and intents of the invention.

An embodiment of the invention is illustrated in the accompanying drawings, wherein:

Figure 2 is a horizontal section taken approximately on the line 2—2 of Fig. 1.

Figure 3 is a horizontal section taken approximately on the line 3—3 of Fig. 1.

Figure 4 is a fragmentary vertical section taken approximately on the line 4—4 of Fig. 1 of the cooperating pressing parts illustrating an operating position on the fruit.

Figure 5 is an inverted horizontal elevation taken in the direction of the arrow 5 in Fig. 6.

Figure 6 is a side elevation of the cutting or penetrating section of the fruit press showing its relation with a cooperating part therefor, said part being shown in dotted lines.

2

Figure 1:
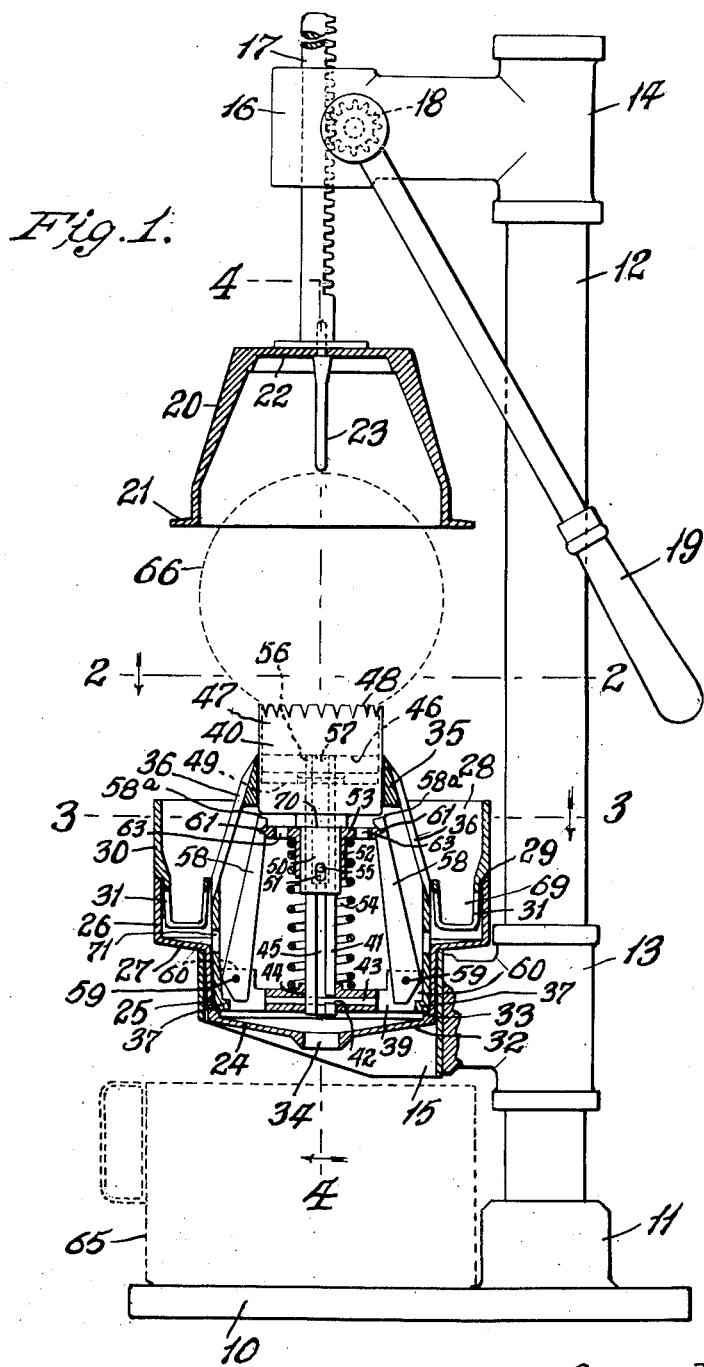
Figure 1 is a vertical section taken through this improved fruit press.

Referring by numerals to the several figures of the accompanying drawings, 10 designates a supporting base having a boss 11 extending upwardly adjacent the perimeter thereof and supported in said boss is a vertically extending post 12 having T-members 13 and 14 thereon, the member 13 horizontally supporting an extended ring-shaped holder 15 and the member 14 being disposed at the upper end of the post and supporting a bearing 16 which is extended in axial alinement with the holder 15.

Mounted in the bearing 16 is a vertically disposed rack-bar 17, the teeth of which being in mesh with the pinion 18 which is horizontally disposed in the bearing 16 and having a handle 19 attached to one side thereof and fixed to the lower end of said rack-bar is a cone-shaped member 20 having an outwardly extending annular flange 21 on its lower end and depending from the closed end 22 of the member 20 and being centrally disposed within said member is a pin 23.

A juice collecting pan 24 having a depending part 25 of a diameter for nesting engagement within the holder 15 is detachably mounted in said holder, said pan also having a large diametered part 26 with a bottom wall portion 27 for seating engagement on the holder.

A residue collecting pan 28 having an annular shoulder 29 intermediately formed on the side wall 30 thereof is mounted on the pan 24 with its shoulder 29 in seating engagement on the upper end of the part 26 of said pan 24, and said pan 28 having an annular gutter 69 which is depended in the pan 24, said gutter having a plurality of transverse slots 31 formed therein.

The bottom wall 32 of the juice collecting pan 24 is provided with an annular shoulder 33 inwardly of the pan and a centrally disposed drain opening 34 in the bottom wall of said pan, and removably seated on the shoulder 33 is a cone-shaped member 35 for cooperative engagement with the cone-shaped member 20 during operation of the fruit press.

The cone-shaped member 35, open at both of its ends, is provided with a series of longitudinal slots 36 intermediate its length and the lower end of said cone having a series of inwardly extending ledges 37 for supporting cooperation with respective spaced ears 38 which are radially extended from the perimeter of the base plate 39 of a cutting or penetrating section 40 of the fruit press.

The cutting section 40 comprises a hollow shaft 41 which is vertically extended from the base plate 39 and is demountably secured to said base plate by a pair of transverse slots 42 on the lower end of said shaft engaging a pin 43 which is disposed transversely of the centrally disposed opening 44 in the base plate 39.

The shaft 41 is provided with an opposing pair of longitudinal extending slots 45, the lower ends of which join the respective transverse slots 42 and fixedly secured to the upper end of said shaft is a horizontal circular plate 46 and slidably mounted over the periphery of said plate is a circular knife 47 having a serrated cutting edge 48 on the upper end thereof, the lower end of said knife being closed by a bottom wall 49, above which the plate 46 is disposed.

Downwardly extended from the bottom wall 49 of the knife 47 is a bushing 50 having opposing longitudinal slots 51 in alinement with the longitudinal slots 45 of the shaft 41, said bushing being slidable on said shaft and slidably mounted on said bushing is a bushing 52 which is concentrically depended from a releasing plate 53 and mounted over said bushing 52 and the shaft 41 is one end of an expansion coil spring 54 in abutment with the releasing plate 53 and at its other end bearing against the base plate 39.

The bushing 52 of the releasing plate 53 has a transverse pin 55 engaged in the slots 51 of the bushing 50 of the knife 47 and the slots 45 in the shaft 41, the coil spring 54 normally holding the releasing plate 53 in abutment with a shoulder 70 on the bushing 50 of the knife.

Mounted on the transverse pin 55 and extending upwardly therefrom in the tubular shaft 41 approximately to the upper surface of the circular plate 46 in the knife 47 is a pin 56 which is counter-sunk at 57 on its upper end and for approximate normal engagement with the bottom wall 49 of the knife are the upper ends 58a of an opposing pair of dogs 58 which are pivoted at 59 between respective pairs of upstanding lugs 60 on the base plate 39, each of said dogs adjacent their upper ends having a notch 61, opposing portions of the periphery of the releasing plate 53 being normally engaged in said notches.

For complete draining of the fruit juices when the press is in operation, in addition to the draining slots 36 in the cone-shaped member 35 a required number of openings 62 are formed in the bottom wall 49 of the knife 47 and in the releasing plate 53 as shown at 63, at 64 in the base plate 39 and at 71 in the wall of the cone-shaped member 35 beneath the slots 36 therein, and for receiving the pressed-out juices a receptacle shown in dotted lines at 65 in Fig. 1 is mounted on the supporting base 10 beneath the pan holder 15.

In the operation of this improved fruit press the whole fruit shown in dotted lines 66 is mounted on the serrated edge 48 of the circular knife 47 and as the pinion 18 is turned in a downwardly operating direction on the rack-bar 17 by the handle 19, the cone-shaped member 20 will be lowered into covering engagement over the fruit, thereby pressing it downwardly for penetration by the knife and approximately simultaneously therewith the depending pin 23 within the member 20 will penetrate the fruit and be forced therethrough and its projecting end will ultimately engage in the countersink 57 of the pin 56.

As the cone-shaped member 20 and the pin 23 carried thereby is continued downward said pin will force the actuating pin 56 downwardly in the tubular shaft 41, and as the pin 56 is carried by the bushing 52 of the releasing plate 53 by the transverse pin 55, the releasing plate 53 will be forced from the respective notches 61 of the dogs 58 thereby forcing the upper ends 58a from beneath the bottom wall 49 of the knife 47 (Fig. 6) and the transverse pin 55, from which the actuating pin 56 is extended, upon engaging the lower ends of the slots 51 in the depending bushing 50 of the knife, will slide the knife and the releasing plate 53 downwardly on the tubular shaft 41, thereby lowering the serrated edge 48 of the knife to a position at least flush with or below the circular plate 46 which is within the knife and/or the upper end of the cone-shaped member 35.

During the time interval of the knife 47 penetrating the fruit the pin 23 of the cone-shaped member 20 was traveling downwardly in penetration of the fruit while the fruit was becoming distorted in pressing on the knife, the projecting end of the pin 23 releasing the knife for downward movement at a time before the cutting edge of the knife reached the upper disposed portion of the skin of the fruit.

As the knife is forced downwardly after cutting a core partially through the fruit, the knife is downwardly withdrawn from the formed core, thereby presenting the penerating end of the cone-shaped member 35 with a closed flat end by the alined surface of the circular plate 46 in the manner as shown in Fig. 4.

After the knife has been withdrawn into the cone-shaped member 35 the upper tapered end of said member is forced through the core opening formed in the skin of the cored end of the fruit so that the skin of the fruit will be mushroomed outwardly over the member 35 as the cone-shaped member 20 is continued to be lowered, thereby squeezing or pressing a maximum amount of juice from the fruit and with the pulp thereof being pressed outwardly against the fruit skin, the pressed-out juice draining downwardly through the slots 36 and openings 71 of 35, the openings 62, 63 and 64 of the respective parts 49, 53 and 39 and into the depending part 25 of the pan 24 from where it is discharged through the opening 34 in the bottom wall of the pan 24, into the receptacle 65.

As the cone-shaped member 20 is withdrawn upwardly from cooperation with the cone-shaped member 35 by reverse turning of the handle 19, the pin 23 of the member 20 will also be moved upwardly with the actuating pin 56 in following contact therewith by reason of the coil spring 54 bearing upwardly against the releasing plate 53.

As the releasing plate 53 is slidable on the bushing 50 of the knife 47 the transverse pin 55 in the bushing 52 of the releasing plate, upon engaging the upper ends of the slots 45 of the tubular shaft 41 will limit further upward travel of the releasing plate and the knife 47 therewith. This limited position of upward return travel of the knife returning it and its cooperating parts to their neutral positions.

As the knife 47 is moved upwardly towards its neutral position, the squeezed mushroom-shaped skin of the fruit is elevated thereby from the cone-shaped member 35 and the plate 46 and is loosely supported on the serrated edge 48 of the knife in readiness for easy removal.

Continued fruit pressing operation may cause pulp fibers to become detached from the fruit and which will become deposited along with the seeds of the fruit in the gutter or trough 69 and as they accumulate, they will be engaged and pressed by the annular flange 21 of the cone-shaped member 20 as said member reaches the end of its pressing stroke and the juices therefrom will detrain through the slots 31 of the trough.

Subsequently and at times, the residue collecting pan 28 can be lifted from the pan 24 and over the cone-shaped member 35 for emptying it of its contents and, of course, is immediatly replaced in readiness for further juice pressing.

While a hand-operated device is shown, it is obvious that cyclically operated mechanical means can be used for reciprocation of the cone-shaped member 20.

The cone-shaped member 35 and the knife section 40 therein can be lifted and removed from its nested position as shown in Figs. 1 and 4, in the pans 24 and 28, in the manner as shown in Fig. 6 for cleaning purposes, providing the cone-shaped member 20 is sufficiently elevated, and for removing the knife section 40 from said member 35, the base plate 39 is turned or rotated in said member to engage the ears 38 in respective spaces between the ledges 37 of the member 35, thereby permitting the knife section 40 to be withdrawn from the lower end of the member 35.

After removal of the knife section 40 from the member 35, downward pressing on the knife 47 and the simultaneous turning thereof will release the cooperating pair of slots 42 at the lower end of the tubular shaft 41 from engagement with the pin 43 so that the shaft 41 can be withdrawn from the base plate and the parts thereof can be readily detached for cleaning purposes.

From the description of this improved fruit press it is obvious that all of the parts contained within the holder 15 are of knock down relations with respect to each other and therefore can be quickly assembled for use after being thoroughly cleaned and the cone-shaped member 20 with its extending rack bar 17 can be readily removed and replaced from and into the bearing 16.

What I claim is:

1. A fruit press comprising a reciprocable cone-shaped member, a stationarily held cone-shaped member in axial alinement with said first member, and a knife movably mounted in said second member, means cooperable with said knife for forcing it into said second member, and means carried by said first member for actuating the cooperable means of said knife.

2. A fruit press comprising a reciprocable cone-shaped member, a stationarily held cone-shaped member in axial alinement with said first member and adapted to be overlapped thereby, a reciprocable cylindrical knife normally projected from said second member, operating means for reciprocating said knife, and means carried by said first member for actuating the operating means of said knife.

3. A fruit press comprising a reciprocable cone-shaped member, a stationarily held cone-shaped member in axial alinement with said first member and adapted to be overlapped thereby, a reciprocable cylindrical knife normally projected from said second member, resiliently actuated operating means for reciprocating said knife, and means carried by said first member for actuating the operating means of said knife.

4. A fruit press comprising a reciprocable cone-shaped member, a stationarily held cone-shaped member in axial alinement with said first member and adapted to be overlapped thereby, a reciprocable cylindrical knife normally projected from said second member, means cooperable with said knife for moving it into said second member, and means carried by said first member for operative engagement with the cooperable means of said knife.

5. A fruit press having a pair of cooperating cone-shaped members disposed in axial alinement, one of said members being reciprocably movable into cooperating position with the other member which is stationarily held, a cylindrical knife normally projected from one end of said stationary member, a fixed plate disposed within said knife approximately flush with said end of said stationary member, and means for moving said knife into said stationary member.

6. A fruit press having a pair of cooperating cone-shaped members disposed in axial alinement, one of said members being reciprocably movable into cooperating position with the other member which is stationarily held, a cylindrical knife normally projected from one end of said stationary member, a fixed plate disposed within said knife approximately flush with said end of said stationary member, and means for moving said knife into said stationary member with its cutting edge approximately flush with said fixed plate.

7. A fruit press having a pair of cooperating cone-shaped members disposed in axial alinement, one of said members being reciprocably movable into cooperating position with the other member which is stationarily held, a cylindrical knife normally projected from one end of said stationary member, a fixed plate disposed within said knife approximately flush with said end of said stationary member, actuating means operably connected to said knife, and means carried by said reciprocable member for operative engagement with said actuating means for forcing the cutting edge of said knife into alinement with said fixed plate.

8. A fruit press comprising a reciprocable cone-shaped member, a stationarily held cone-shaped member in axial alinement with said first member and adapted to be overlapped thereby, a reciprocable cylindrical knife resiliently projected from one end of said second member, actuating means for said knife, and means carried by said first member for operative engagement with the actuating means of said knife.

9. A fruit press having a horizontally disposed ring-like holder, a juice collecting pan demountably secured in said holder, a residue collecting pan removably mounted on said other pan and having an inner disposed perforated annular trough, and a slotted cone-shaped member demountably secured in said juice collecting pan.

10. A fruit press having a horizontally disposed ring-like holder, a juice collecting pan demountably secured in said holder, a residue collecting pan removably mounted on said other pan and having an inner disposed perforated annular trough, a slotted cone-shaped member demountably secured in said juice collecting pan, and a cylindrical knife mounted in said member and having its cutting edge resiliently projected from the upper end of said member.

11. A cutting mechanism for a fruit press comprising a vertically disposed cone-shaped member having a cylindrical knife resiliently projected from its upper end, means cooperable with the knife for resisting it from being forced into said member, a releasable member cooperable with the cooperable means of said knife, and reciprocable means intermittently cooperable with said released member.

12. A fruit press having a horizontally disposed ring-like holder, a juice collecting pan demountably secured in said holder, a residue collecting pan removably mounted on said other pan and having an inner disposed perforated annular trough, a slotted cone-shaped member demountably secured in said juice collecting pan and carrying a cylindrical knife, actuating means for said knife, and an inverted funnel-shaped member reciprocably mounted in axial alinement with said other member and having a centrally disposed part for operative engagement with the actuating means of said knife.

13. A fruit press comprising a reciprocable cone-shaped member, a stationarily held cone-shaped member in axial alinement with said first member and adapted to be overlapped thereby, a reciprocable cylindrical knife resiliently projected from one end of said second member, a fixed plate disposed within said knife, actuating means for said knife having a part reciprocably mounted in said plate, and means carried by said first member for operative engagement with said part of said knife actuating means.

14. A core cutting mechanism for a fruit press comprising a cone-shaped member having an opening in its tapered end, a cylindrical knife normally projected from the opening in said member, a fixed plate in said knife and a pin longitudinally reciprocable therein, means in co-operation with said pin for holding said knife projected from said member, and a reciprocably mounted member for fruit squeezing cooperation with said cone-shaped member and having a part for operative engagement with said pin for forcing said knife into said cone-shaped member.

GEORGE F. KAHRE.

REFERENCES CITED

The following references are of record in the file of this patent:

UNITED STATES PATENTS

| Number | Name | Date |
|---|---|---|
| 625,507 | Hunt | May 23, 1899 |
| 1,264,080 | Jennings | Apr. 23, 1918 |
| 2,151,500 | Cecil | Mar. 21, 1939 |
| 2,346,561 | Delay | Apr. 11, 1944 |
| 2,404,382 | Klein | July 23, 1946 |

FOREIGN PATENTS

| Number | Country | Date |
|---|---|---|
| 169,297 | Switzerland | May 31, 1934 |